Nov. 25, 1952 G. D. ARNOLD 2,618,865
ROTARY DRUM HEAT EXCHANGER
Filed March 12, 1948 2 SHEETS—SHEET 1

INVENTOR.
GERALD D. ARNOLD
BY
Wheeler, Wheeler & Wheeler
ATTORNEYS

Nov. 25, 1952  G. D. ARNOLD  2,618,865
ROTARY DRUM HEAT EXCHANGER
Filed March 12, 1948  2 SHEETS—SHEET 2
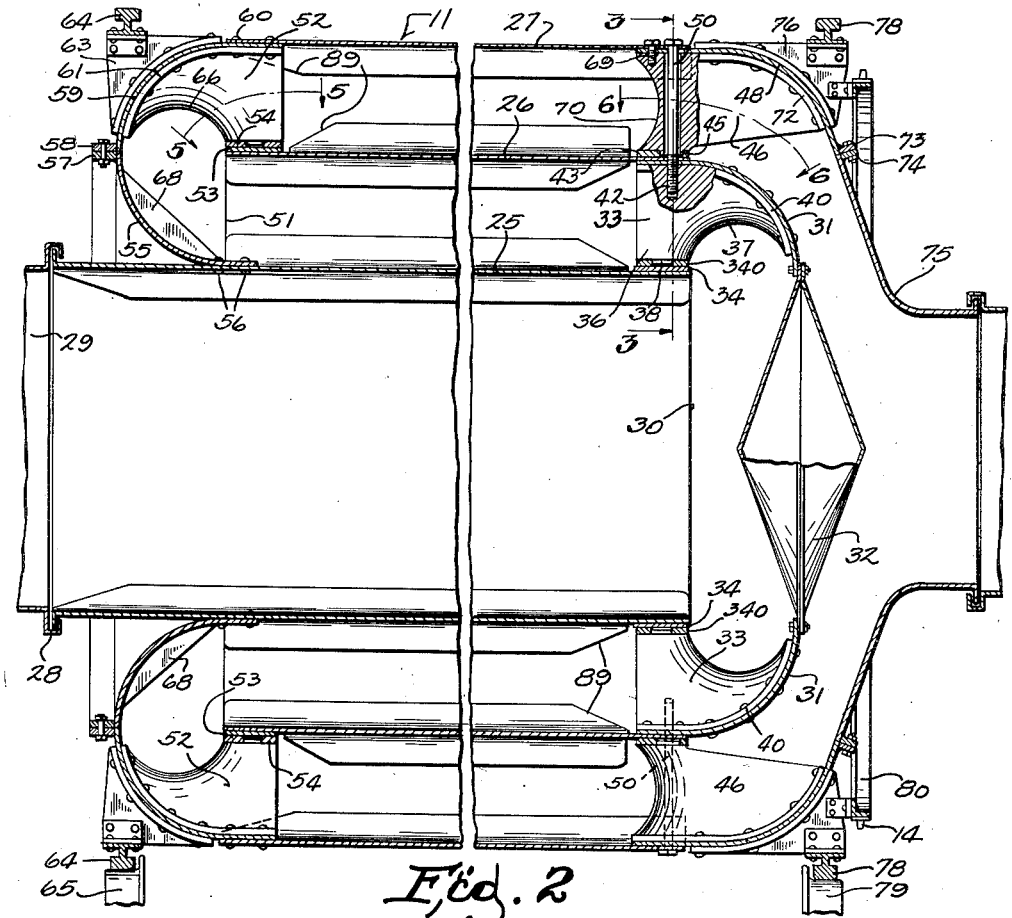
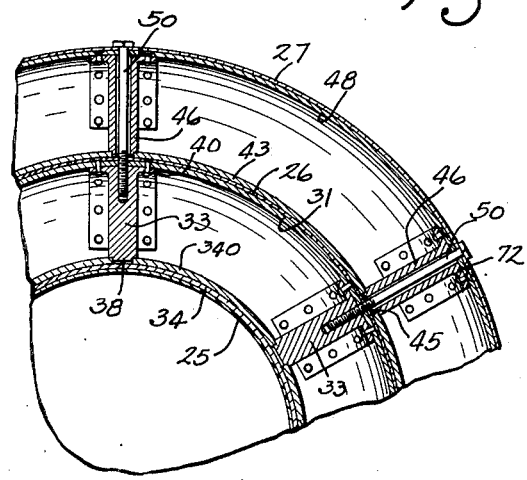
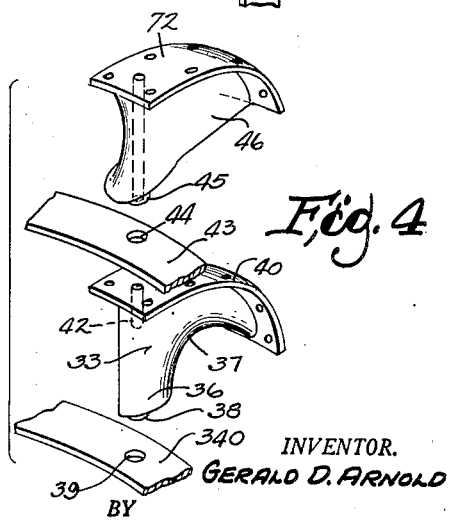
INVENTOR.
GERALD D. ARNOLD
BY
Wheeler, Wheeler + Wheeler
ATTORNEYS Patented Nov. 25, 1952

2,618,865

UNITED STATES PATENT OFFICE 2,618,865

ROTARY DRUM HEAT EXCHANGER

Gerald D. Arnold, Wauwatosa, Wis.

Application March 12, 1948, Serial No. 14,503

20 Claims. (Cl. 34—128)

This invention relates to a rotary drum heat exchanger. The present invention is an improvement on apparatus of the type illustrated in my Patent No. 2,076,873.

The objects of this invention are to increase the capacity, to assure more uniformity of dehydrated or cooled product and more economical operation, and to be able to dehydrate or cool a longer or coarser cut product than can successfully be done with previous constructions.

It is a further important object of the invention to provide a construction in which there is a novel assembly of the heads and gussets to the several concentric drums thereby facilitating the assembly and repair of the apparatus and permitting freedom of expansion or contraction without any danger of buckling the drums or causing such parts as bolts to become sheared and drop into the interior of the apparatus.

There are two principal ways in which the capacity of the apparatus is increased: First, by reason of the shape, the numbers, and the arrangement of double curved flights to produce a more effective and distributed showering of the material through the stream of hot gases traversing the drums. Secondly, because the gussets herein disclosed will handle longer or more coarsely chopped hay partially dried in the windrow, I am able greatly to increase the capacity of the heat exchange drums and the economy of the whole operation. The longer or more coarsely chopped hay may be obtained with lower power consumption and lower cost of operation of the field chopper. At the same time the fact that the material moves with greater uniformity through the drum and tends to remain in the drum for a stated period of time produces a more uniform product and enables a larger amount of material to be treated with gases at a lower temperature than would otherwise be possible. Uniformity of uninterrupted travel is further secured by extending the gussets into the drum head thereby eliminating any possibility of the heaviest material rolling around on the bottom of the curved drum heads. Without extending the gussets into the drum heads, the gas current may not have sufficient force to pick up these heavy particles and carry them to the next succeeding cylinder. With the gussets extending into the curved heads all the material is carried up toward top of the cylinders in every revolution of the drum; which means a positive advance of all the material on every revolution of the drum, without any tendency of the material to accumulate at any point in traverse.

Due to the curved drum heads and the absence of baffles at right angles to the gas current within the drum all air pockets, eddy currents, and the dwell of any of the material in its traverse of drum is eliminated. Not only is there more uniformity in heat treatment, but less change in texture of the product treated. For example, there is less shattering of leaves in the pneumatic propulsion of drying or cooling alfalfa through this drum than in previous constructions. The shattering of leaves means a dusty product which is objectionable in itself, but also makes it next to impossible to pneumatically store the dehydrated and cooled product without separating the powdered leaves from the stems of the alfalfa.

Other objects of the invention will be apparent from the following disclosure thereof.

In the drawings:

Fig. 2 is an enlarged fragmentary detail view in axial section through either of the drums shown in Fig. 1.

Fig. 3 is a fragmentary detail view taken in section on the line 3—3 of Fig. 2.

Fig. 4 is a detail view in perspective showing relatively separated component parts of the gussets and the connecting parts of the respective drums.

Figure 1:
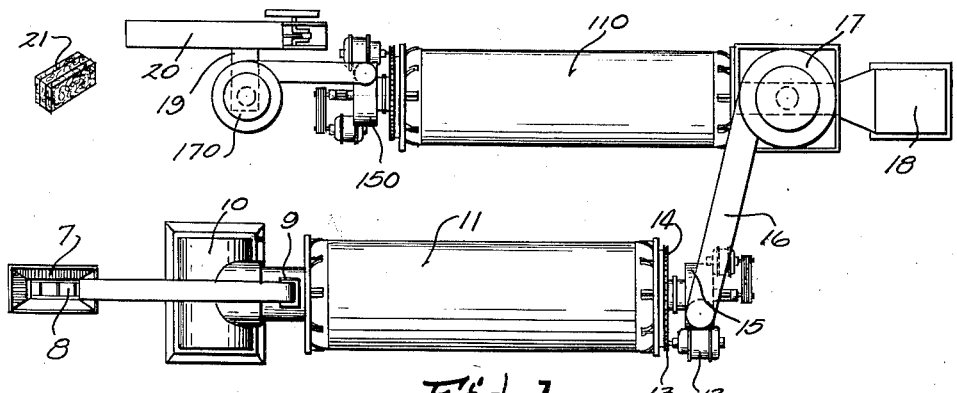
Fig. 1 is a plan view of the apparatus embodying the invention for use both in dehydrating and in cooling.

While the invention is particularly concerned with the specific drum structure, I have illustrated the general organization in Fig. 1 to demonstrate the fact that the drum is useful for refrigeration or cooling as well as for heating the material treated.

The material to be treated is delivered into a loading hopper 7 where it is picked up by conveyor 8 and carried upwardly to the charging valve 9 which lies between the furnace 10 and the multiple cylinder drum generically designated by reference character 11.

This drum is rotated from the motor 12 by any suitable means, such as the chain 13 acting on a sprocket 14 applied to the end of the drum. As the drum rotates, the material passing therethrough with a current of air from furnace 19 is heated and thereby dehydrated and ultimately issues from the drum into the eye of the blower fan 15 which blows the material through pipe 16 to a separator 17. The separator discharges the dehydrated material into the path of air admitted through the cooler or refrigerating apparatus 18 to a multiple cylinder cooling drum 110 which may be identical in construction with that shown at 11 but may be of a different size. It is rotated in the same manner to shower the material through the current of air traversing the drum. Ultimately the material issues from the cooling drum 110 and is picked up by another blower fan at 150 which delivers it to a separator 170 from which the air passes to the atmosphere and the dehydrated and cooled material drops into the feed chamber 19 of a baler 20. A completed bale is shown at 21.

One of the advantages of the type of drum herein disclosed lies in its ability to handle long enough strands of material to permit of the baling thereof. In the past it has been necessary to chop material so finely for purposes of dehydration that it could no longer be baled. The high temperature to which it has been necessary to raise the material in order to effect reasonably good dehydration thereof is another factor which has precluded baling, as the material may ultimately catch fire through spontaneous combustion if baled and stored while at the temperature at which it commonly issues from the dehydrating apparatus. In the use of the present device, the material is cooled to a temperature sufficiently low so that it may safely be baled and immediately stored.

These bales of pre-cooled material, if packed tightly in storage will retain (due to their self-insulating qualities) their vitamins and food nutrient content better than forage processed by previous methods and equipment. Another advantage of long cut hay is that stock relish it better, chew their cuds (thus assuring higher digestibility) and there is less possibility of cattle getting sore mouths, such as are frequently found when cattle are fed short cut, dehydrated produce containing stiff, short stems. However, within the scope of this invention, the dehydrated and cooled produce may be fine or coarse ground, stored in bulk, or briqueted, or baled, and fed in any form.

The equipment illustrated is desirable and even necessary to successfully dehydrate and cool long cut or shredded forage, which may include not only grass, clover, alfalfa and the like, but also the corn plant, maize, sorghum, sugar cane, and canning factory by-products.

It also has a more efficient heat exchange than previous construction when operating either on long or short chopped material. Freshly cut green hay of 80% moisture may require 75 gal. per hour of oil to produce 1 ton of dehydrated hay. With hay that is half dried in windrows to 40 to 50% moisture, the leaves will not be dropped nor any substantial loss of color occur and this same machine will handle such material to produce 3 to 4 tons of dehydrated hay per hour with a fuel consumption of 40 gals. Thus, using the method and the apparatus herein disclosed, it requires only 10 to 15 gals. of oil to produce one ton of high quality dehydrated hay. Not only this, but if the product is sufficiently cooled, and stored immediately after dehydrating, in three months time it will be a greener and better product with the vitamins and food nutrients retained better than a freshly cut and immediately dehydrated product that has not similarly been cooled and immediately stored.

Figure 7:
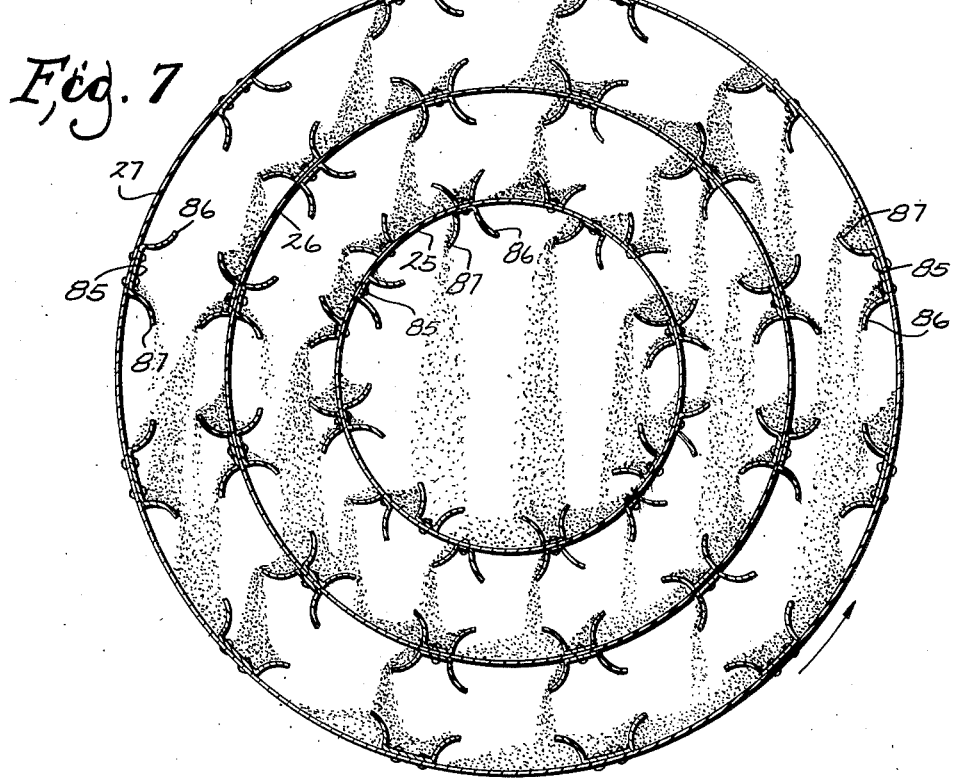
Fig. 7 is a view in transverse section through the drum of Fig. 2 diagrammatically illustrating the positions and form of the respective flights and the manner in which these flights effect a more perfect distribution of the material throughout the path of the gases traversing the drums.

Referring now to Figs. 2, 3 and 7, it will be noted that each of the drums comprises an inner cylinder 25, an intermediate cylinder 26, and an outer cylinder 27.

The inner cylinder 25 projects axially from the drum and is provided with an air-excluding coupling at 28 to the pipe 29 through which the air and the material to be treated both enter into the drum.

As the drum rotates, flights (hereinafter described) in the interior of the inner cylinder lift the material and cause it to shower downwardly across the path of gases moving through the drum. At the end 30 of the inner cylinder the material leaves the inner cylinder and enters a space within the quarter-doughnut head segment 31. This head is annular and is curved about 90° in cross section from the closure 32 radially outwardly and thence axially to engage the end of the intermediate cylinder 26. The closure 32 may conveniently be made of two cones placed base to base with their apices projecting oppositely, the cones being flanged at their mating peripheries and bolted to the concave head segment 31.

The gussets 33 support the head segment 31 and the intermediate cylinder 26 from the end portion 30 of the inner drum 25. Immediately on the end of the drum, I provide a collar or wear sleeve 34 which is in the nature of a bushing and is preferably secured by welding to the outer periphery of the inner drum 25. Upon this collar 34 is telescoped a floating band or slip ring 340 upon which rests the smaller end 36 of each of the gussets 33. These gussets are so shaped as to extend into the head and to present a concave edge at 37 to the path of flow of the material. However, in each cross section of the gusset along the line of material flow, the gusset has a streamlined form of the type generally indicated in the section 5—5 of Fig. 5. Inasmuch as the gusset increases its axial extent in accordance with its radius, as clearly appears from Fig. 4, the outer periphery or pad portion 40 of the gusset is much greater than its axial extent at its inner end 36 and its streamlined form is correspondingly elongated at the outer radius.

The gussets 33 are not made fast to the inner cylinder 25 or even to the band 340. Instead, each gusset is preferably provided integrally with a stud at 38 positioned in a socket 39 in the band 340. Each gusset is provided at its outer end with a curvilinear plate or pad 40 to which the semi-doughnut shaped head is welded or riveted as shown.

Each of the gussets 33 is provided with a tapped bore at 42 which extends outwardly through the arcuate plate 40 on the outside of the gusset. The intermediate cylinder 26 has a registering bore. Mounted externally on the intermediate cylinders 26 is a band at 43 corresponding to the band 340 already described. Band 43 has sockets at 44 registering with bore 42 and adapted to receive the studs 45 of the outer gussets 46 which are connected with the outer drum 27 and its head segment 48. Bolts 50 pass from the outside of the drum inwardly through the outer cylinder 27 and the gussets 46 and the studs 45 and the intermediate cylinder 26 into the tapped openings 42 in the gussets 33. These bolts secure the entire apparatus together as will hereinafter be explained in more detail.

The end 51 of the intermediate cylinder 26 floats within the annular series of gussets 52. At the inner end 51 of the intermediate cylinder 26, I provide a wear sleeve or collar 53 which may be welded thereto and which, as in the case of the collars previously described, serves something the function of a bushing. This collar is floatingly telescoped within the band 54 which is centered by the several gussets 52 connected to the outer cylinder or shell 27, which, in turn, is supported from the inner cylinder or shell 25. Thus the end of the intermediate cylinder 26 is entirely free to expand or contract as required by any changes in temperature to which it may be exposed.

The material traversing the passage between the inner cylinder 25 and the intermediate cylinder 26 must be carried around the free end 51 of the intermediate cylinder 26 to enter the passage between the intermediate cylinder 26 and the outer cylinder or shell 27. To this end, I provide two ninety degree segments of a semi-doughnut shaped head, the inner segment 55 being welded or riveted at 56 to the inner cylinder 25 and terminating in an annular flange 57 which is substantially cylindrical and spaced outwardly from the receiving end of the inner cylinder. Co-acting with flange 57 is a like flange 58 on the outer segment 59, which extends into and is riveted or otherwise connected at 60 with the outer cylinder 27. The gussets 52 extend with ever increasing axial extent from their inner ends 54 outwardly to the pads or flanges at 61 which are riveted to the head segment 59, the same rivets carrying the brackets 63 for the riding ring 64 upon which the entire drum is supported for rotation upon suitable wheels at 65.

Figure 5:
Fig. 5 is a sectional view taken on section 5—5 of Fig. 2.

As in the case of the gussets 33, the gussets shown at 52 extend into the head segment and present concave leading edges at 66 to the path of the current and the material carried thereby. These gussets are also streamlined in any cross section along such path as shown in Fig. 5.

The inner segment 55 of the semi-doughnut head, having no gussets to facilitate advance of material, may desirably be provided with integral internal radial webs 68 for this purpose.

Figure 6:
Fig. 6 is a detail view taken in section on the line 6—6 of Fig. 2.

The righthand end of the outer cylinder 27, as viewed in Fig. 2, is fastened to the head member 48 both by the long bolts 50 already described and by special short bolts 69. As in the base of the gussets previously described, the gussets 46 have their leading edges, confronted by the air current, made concave as shown at 70. Also, in each section taken along the path of the gaseous current of the material entrained therein, the gusset has a streamlined cross section as indicated by the section 6—6 of Fig. 6.

The head member 48 extends about the gusset 46, supported on the flange or pad 72 thereof on a radius of somewhat less than 90 degrees, terminating in a flange at 73 bolted to the complementary flange 74 of the discharge fitting 75. Brackets 76 are bonded radially at spaced intervals about the periphery of the head member 48, for the support of the riding band 78 which, like the riding band at 64 already described, is supported on flanged wheels 79 upon which the assembly as a whole is rotatable. The same brackets 76 support a driving ring at 80 for belt or chain drive and provided with the sprocket teeth 81 if driven by the driving chain 13.

The assembly of the apparatus is effected as follows:

The inner drum 25 first has assembled to it the inner concave head segment 55 of the lefthand head as viewed in Fig. 2. The outer drum 27 has assembled to it the outer segment 59 of the lefthand head, in addition to the gussets 52 and the brackets 63.

In making this latter assembly, the ring 54 may conveniently be laid flat on a horizontal surface and the six gusset members 52 assembled around it with their respective studs engaged in the apertures with which the bushing ring 54 is provided. The head portion 59 and brackets 63 are then assembled about the radially arranged gussets and riveted thereto. When this is done, this assembly is slid onto the end of the outer drum 27 and riveted into place. The outer drum with its head and gussets is next assembled with the inner drum by registering its head flange 58 with the flange 57 of the inner head section 55 and riveting or bolting the two together.

A similar assembly is then prepared by arranging the six gusset members 33 radially about the band 340 with their respective studs engaged in the apertures 39 of said band. The head segment 31 is then laid on the pads 40 of the gussets and riveted thereto. This sub-assembly is then slid into the righthand end of the intermediate drum 26 (as viewed in Fig. 2) and riveted in place, after which the intermediate drum 26 is inserted into the band or ring 54 in the left end head assembly first described. The wear collar 53 of the intermediate drum 26 has quite a loose fit in the band 54 to allow considerable freedom of expansion and contraction or other movement of the free end of the intermediate drum 26.

The fourth head assembly comprising the gussets 46, the band 43 and the head segment 48 is now completed and slipped over the ends of the outer shell 27 and anchored by means of bolts 69 and 50. It will be noted from the drawings that the bolts 50 are long bolts which pass completely through the gussets 46 into the gussets 33 and are there anchored.

Thus, as viewed in Fig. 2, the lefthand ends of outer drum 27 and inner drum 25 are rigidly connected through the head segments 55, 59. But the righthand end of the inner drum is free to expand and contract axially being spaced radially by the six gussets 33 and the six gussets 46 from the outer drum but having its wear sleeve 34 floating within band 340. Similarly the right end of intermediate drum 26 is anchored by bolts 50 but its left end is floated in band 54. Thus all drums can expand and contract without stress. The bolts 50 are not only free of stress but, even if sheared, could not fall into the drums. Moreover, the bolts 50 and 69 whereby the final assembly is made are all accessible exteriorly requiring no inside work for assembly or disassembly.

I have made an extensive study to determine the nature of the best possible flights in the interior of the drum to effect a desirable distribution of materials throughout the path of the air traversing the passages between the respective cylinders. I have also studied the form that these flights should take and their spacing from each other in relation to the most desirable speed at which the drum should rotate.

Fig. 7 diagrammatically illustrates the results of these studies. The drum there illustrated rotates in a counterclockwise direction, although the action would be similar if the direction of rotation were reversed, this being one of the advantages of the type of flight hereinafter to be disclosed. I have found it desirable in the case of a seven foot drum (external diameter) to rotate the drum at approximately 10½ R. P. M.

The type of flight which I have found it most advantageous to use is one made in the form of a channel having a base web 85 and a pair of outwardly curvilinearly divergent flanges 86, 87. The divergence of the flanges is not only advantageous to control showering, but it exposes the base web for riveting or welding the flight to the drum. In the case of the inner drum 25 where the radius is quite small, these flanges 86 and 87 may be disposed quite close together as clearly shown in Fig. 7. The same is true on the outer periphery of the inner cylinder 25. However, in the case of the cylinders 26 and 27, I provide a progressively increasing width of the base web, thereby spreading the flanges 86 and 87 farther and farther apart as the radius of the drum increases.

I have found it very desirable that the space between the remote edges of the respective flanges 86 and 87 of a given flight channel should correspond almost exactly with the spacing between the margins of the flanges of adjacent channels. To achieve this result, I use a slightly wider web in the flight channels of the eight flights in the interior of the cylinder 25 than I use in the twelve channels on the exterior of that cylinder. It will be noted that on the exterior of the cylinder 25 and on both sides of the cylinder 26 and the interior of cylinder 27 there are twelve sets of flight channels in each instance. Moreover, I prefer to arrange the respective flight channels on corresponding radii, secured by the same rivets, except where the reduced circumference makes it necessary to space them differently as in the interior of the cylinder 25.

A great advantage in the use of channel-shaped flight members lies in the reenforcement afforded to the respective cylinders. The intermediate cylinder 26 in particular becomes very rigid due to the fact that it has registering channels on its inner and outer peripheries, giving the general effect of I-beams extending axially of the cylinder at these points. Similarly, every second channel on the interior of the inner cylinder 25 registers with every third channel on the outer periphery of that cylinder.

Another advantage of this type and arrangement of flights is that there is very little difference in weight of the material being carried up and that being supported by the flights going down. This results in a balanced load which takes less power to make the drum revolve. This is particularly desirable when dehydrating or cooling a heavy product like grain.

The greatest advantage, however, lies in the showering effect which is indicated by the stippling. This distributes the material acted upon by the air currents in a much more effective manner throughout the cylinders than has previously been possible. There is obviously a tendency for such material to accumulate in the bottom of each cylinder. As the cylinder rotates counterclockwise, the material so tending to accumulate in the bottom of each cylinder is carried upwardly to the right and ultimately it spills from those flanges 86 which have a reverse curve but it is retained in those flanges 87 which curve upwardly. In each case the material spilling from one set of flights will tend to be picked up by the flanges of the flight therebeneath.

As the flights pass the horizontal center line, there will be a spilling from those flanges 87 which curve upwardly, such spilling continuing as the angle changes. It will be noted from inspection of Fig. 7, that the flight which has just passed the horizontal center line is spilling material which may be caught in part by one of the flights on the outer periphery of the intermediate cylinder 26. By the time the flights of both cylinders have passed materially above the horizontal center line, even the downwardly curved flights as well as the upwardly curved flights are catching and retaining material.

The view diagrammatically illustrates how, as the flights pass the vertical center line, a different kind of spilling occurs but spilling continues from some flights almost throughout the entire range of rotation of the respective cylinders. The flights which have received and temporarily retained material spilled from other flights will, during continued rotation, spill such material again. Thus the flights on the exterior of cylinders 25 and 26, having received spilled material at the top of the circuit, release or spill such material clear across the bottom of the circuit, thus contributing to a showering of the material substantially throughout the cross section of the current of treating gases. In all previous constructions, large sections of the air current, particularly at the bottoms of the cylinders, have been unused.

Since the respective flights present substantially continuous edges extending from end to end of the respective cylinders, there is little or no tendency for the material passing through the cylinders with the air stream to catch thereon. However, the ends of the flights first encountered by the material, are preferably provided with elongated bevels as indicated at 89 in Fig. 2.

I have found that where relatively long strands of material are involved, as in long cut hay, while it is very helpful to streamline the gussets, there will still be some tendency for the material to hang thereon unless the gussets are also made concave in a radial plane as shown in Fig. 2. Where this is done, any material tending to lodge across any portion of the concavely curved arcuate leading edge of the gusset will tend to move with the air stream into the central path where the air current is the strongest. The mere movement of the material along the edge of the gusset will also tend to displace it to one side or the other so that almost invariably the stringy material will become dislodged from the edge and continue to move with the air stream. Particularly since the passage around each of the concave heads is of substantially uniform cross section, there are no dead spots or corners in which material may be lodged and the air flow is substantially continuous and uniform throughout all cross sections of the apparatus.

The extension of the gussets 33, 46 and 52 into the respective heads helps to lift and return to the air stream any material which might otherwise dwell in the heads, out of reach of the flights.

Since there is no place for the material to lodge, its movement will be substantially continuous and uniform through the apparatus and since the flights tend to keep the material showering quite uniformly throughout the entire cross section of each cylinder, a much more effective use of the heat exchange capacity of the air or gases within the cylinder is made than would otherwise be the case. As a result I am able to achieve a given amount of dehydration with less increase of the temperature of the product while being dehydrated, or a given amount of cooling with greater lowering of the temperature of the product in the process of being cooled; this is due to a greater efficiency of heat transfer than heretofore achievable, at the same time I secure a much better and more uniformly treated product.

I claim:

1. A multiple cylinder heat exchange drum comprising in combination an inner cylinder having inlet and delivery ends, an intermediate cylinder having a receiving end near the delivery end of the inner cylinder and having its delivery end near the inlet end of the inner cylinder, and an outer cylinder having its inlet and delivery ends corresponding to those of the inner cylinder, means comprising a concave head for guiding material from the inner cylinder to the intermediate cylinder, first gussets connected with the receiving end of the intermediate cylinder and with said head and having a sliding bearing on the delivery end of the inner cylinder, a concave head extending from the inner cylinder about the delivery end of the intermediate cylinder to the receiving end of the outer cylinder, second gussets connected with the outer cylinder and with said head and having a sliding bearing respecting the delivery end of the intermediate cylinder, and a concave head connected with the delivery end of the outer cylinder, and third gussets connected with the outer cylinder and said head and also connected with the receiving end of the intermediate cylinder, the receiving end of the intermediate cylinder and the receiving end of the inner cylinder being relatively fixed respecting the outer cylinder, and the delivery ends of the inner and intermediate cylinders being free to expand and contract with respect to each other and the outer cylinder, said sliding bearings comprising floating bands having sockets, said first and second gussets having studs engaged in said band sockets.

2. The combination set forth in claim 1 in which each of the respective gussets is streamlined in the direction of flow and provided with a margin first encountered by the flow which is concave in a radial direction.

3. A multiple cylinder heat exchange drum comprising the combination with an inner cylinder having an admission end and a delivery end, a head segment connected externally with the inner cylinder adjacent the said admission end thereof and extending arcuately outwardly from such end, a second head segment connected with the segment first mentioned and continuing in substantially the same arc outwardly and reversely toward the delivery end of the inner cylinder, an annular series of substantially radial gussets connected with the head segment last mentioned and projecting inwardly in annular series, a band supported on the inner ends of the respective gussets, an intermediate cylinder having its delivery end floatingly mounted within said band and terminating short of the said segments, an outer cylinder connected with the second segment aforesaid and spaced by said gussets from the intermediate cylinder, said outer cylinder extending outside of the intermediate cylinder and having a delivery end encircling the delivery end of the inner cylinder, gussets in second and third annular series respectively between the outer and intermediate cylinders and between the intermediate and inner cylinders adjacent the delivery end of the latter, the outer and intermediate cylinders being fixed to the second annular series of gussets, and the delivery end of the inner cylinder having a floating bearing including a band interlocked with and supported by the gussets of the third series.

4. The combination set forth in claim 3 in further combination with a quarter segmental annular head connected with the inlet end of the intermediate cylinder and extending about the gussets of the third series, and another segmental head externally thereof connected with the delivery end of the outer cylinder and extending about the gussets of the second series, said gussets extending into the respective heads.

5. In a multiple cylinder heat exchange drum, the combination with an inner cylinder having inlet and delivery ends, of a quarter segmental annular head connected with an intermediate portion of the inner cylinder and extending thence toward its inlet end and curvilinearly outwardly therefrom approximately 90 degrees, said head terminating in an annular cylindrical flange, a second quarter segmental head having a flange complementary to the flange of the segmental head first mentioned and connected therewith and extending radially outwardly and curvilinearly rearwardly therefrom, a set of substantially radial gussets connected with the head segment last mentioned, an outer cylinder connected with the head segment last mentioned and continuing therefrom substantially concentric with the inner cylinder toward the delivery end of the inner cylinder, an intermediate cylinder between the inner and outer cylinders, gussets between the delivery end of the inner cylinder and the intermediate cylinder, and gussets between said intermediate cylinder and said outer cylinder, brackets connected with the second mentioned head segment opposite the first mentioned gussets and through said head segment with the gussets, and a riding band mounted upon said brackets externally of said drum.

6. In a multiple cylinder heat exchange drum, the combination with an inner cylinder having admission and delivery ends, of a slip ring extending about the delivery end of the inner cylinder, a plurality of gussets arranged substantially radially and in annular series about the slip ring and having interlocking positioning connection therewith, a concave annular head segment having a receiving end spaced axially from the delivery end of the inner cylinder, said segment extending arcuately outwardly and reversely about the delivery end of the inner cylinder and connected with said gussets, an intermediate cylinder having a receiving end constituting a continuation of the head segment aforesaid and extending in spaced relation to the inner cylinder toward the admission end thereof, a second head segment having a substantially cylindrical portion connected with the inner cylinder intermediate the ends thereof and extending arcuately toward the admission end of the inner cylinder and outwardly therefrom, a third head segment connected with the second head segment and constituting an arcuate extension thereof outwardly and reversely about the end of the intermediate cylinder in spaced relation thereto, a second set of gussets in annular series connected with said third head segment and extending radially inwardly toward the intermediate cylinder, a slip ring with which the inner portions of the second gussets have interlocking positioning connection, said slip ring being slidably mounted on the delivery end of the intermediate cylinder in spaced relation to said head segments, whereby said delivery end of the intermediate cylinder is floatingly positioned by said second gussets, an outer cylinder connected with said second gussets and with the third head segment and extending substantially coaxially with the inner and intermediate cylinders toward the delivery end of the inner cylinder but outwardly spaced therefrom, a fourth head segment extending from the delivery end of the outer cylinder inwardly about the receiving end of the intermediate cylinder in spaced relation thereto, a third set of gussets in annular series substantially radially disposed between the outer and intermediate cylinders, and a connection extending from the outer cylinder into engagement and positioning association with the receiving end of the intermediate cylinder.

7. The combination set forth in claim 6, in which the several gussets are each streamlined in the direction of flow from one cylinder to another and each of said gussets is provided with a leading edge which is concave in a radial plane.

8. In an enclosed multiple cylinder heat exchange drum, the combination with inner, intermediate and outer cylinders, of a first annular series of gussets between the inner and intermediate cylinders at one end thereof, a second annular series of gussets between the intermediate and outer cylinders at the same end of the intermediate cylinder, and a third annular series of gussets between the outer cylinder and the other end of the intermediate cylinder, together with a plurality of bolts accessible from the outside of the outer cylinder and extending through respective gussets of the second series into engagement with corresponding gussets of the first series, the intermediate cylinder being dependent upon said bolts for its axial position and having one end floatingly mounted within the gussets of the third series.

9. In a multiple cylinder heat exchange drum, the combination with inner, intermediate and outer cylinders, of a curvilinearly arcuate annular head comprising a plurality of segments and extending from the inner cylinder to the outer cylinder about the end of the intermediate cylinder, gussets in annular series connected with the second segment of said head and extending radially inwardly from the outer cylinder toward the inner cylinder, the intermediate cylinder having an end floatingly mounted within said gussets and loosely positioned thereby, a second head segment extending from the opposite end of the intermediate cylinder inwardly about one end of the inner cylinder and in spaced relation thereto, a third head segment spaced outwardly from the second head segment and connected with the outer cylinder and extending thence inwardly about the end of the intermediate cylinder and in spaced relation thereto, gussets in second and third annular series, the respective gussets of the respective series being in substantially radial alignment and interposed between the inner and intermediate cylinder and the intermediate and outer cylinders, and two sets of radial brackets respectively mounted on the second and the last mentioned head segments and connected with gussets of the first and third series within said head segments, together with riding bands mounted on said brackets at opposite ends of the drum for the rotative support thereof.

10. The device of claim 9 in which each of said gussets has a streamlined cross sectional form in the direction of flow thereover and is provided with a leading edge first encountered by such flow which has a substantially 130° concave in a radial plane.

11. The device of claim 9 in which the intermediate cylinder is provided with channel-shaped flights in corresponding locations on its inner and outer periphery and connected through said periphery.

12. The device of claim 9 in which the inner periphery of one of said cylinders and the outer periphery of a next smaller cylinder are both provided with flights having mounting portions and oppositely directed flanges whereby material dropped from one of said flanges will tend to fall across the intervening space and be caught upon a flange of a flight of the other cylinder.

13. The combination with a pair of concentric drums, of corresponding pairs of flights on substantially radially aligned centers on the inner periphery of the outer of the drums and the outer periphery of the inner drum, each pairs of flights comprising flanges extending divergently from each other away from the drum surface.

14. In a multiple cylinder heat exchange drum, the combination with outer, inner and intermediate cylinders, of flights connected with the inner and outer peripheries of the intermediate cylinder, said flights including common mounting portions connected with the intermediate cylinder and flanges extending divergently away from both sides of the mounting portions and away from the periphery of the cylinder, the outer cylinder and inner cylinder having corresponding flights radially aligned to be disposed opposite the flights of the intermediate cylinder aforesaid.

15. The device of claim 14 in which the flanges of the respective flights are arcuately curved away from each other.

16. The device of claim 14 in which the flanges of the respective flights are arcuately curved away from each other, said flights terminating short of the ends of the respective cylinders, and said cylinders having head segments and gussets providing means for spacing the cylinders from each other and engaged with the respective cylinders near their respective ends.

17. In a multiple cylinder heat exchange drum, the combination with inner, intermediate and outer cylinders, of flights in corresponding locations on the inner and outer peripheries of the intermediate cylinder and connected together through such intermediate cylinder, each such flight including an intermediate mounting portion abutting the cylinder and flanges extending divergently from both sides of the mounting portions, the opposing faces of the inner and outer cylinders having correspondingly shaped flights correspondingly located in substantial radial alignment with the flights of the intermediate cylinder aforesaid.

18. The combination set forth in claim 17 wherein the width of the mounting portion of the respective flights is progressively increased from the inner cylinder to the outer cylinder and the spacing between the free edges of the flanges of each flight across its mounting portion substantially corresponds to the spacing between the free edges of the flanges of adjacent flights.

19. In a multiple cylinder heat exchange drum, the combination which comprises a cylinder drum, a band encircling said cylinder near an end thereof, the band being provided with apertures, a second cylinder spaced outwardly from the cylinder first mentioned, and a series of gussets connected with the second cylinder and each having at its inner end a stud engaged in an aperture of said band and projecting toward said first mentioned cylinder, the length of the studs being no greater than the thickness of the band and the first cylinder end portion encircled by said band being slidable therein relative to said studs.

20. In a multiple cylinder heat exchange drum, the combination which comprises inner, intermediate and outer cylinders, radial gussets in annular series between the inner and intermediate cylinders, radial gussets in a second annular series between the intermediate and outer cylinders, the gussets of the respective series being substantially in alignment and the gussets of the first series having threaded connecting means, the gussets of the second series having holes registering with said threaded connecting means, and bolts extending from the outer cylinder through the holes of the gussets of the second series into the threaded connecting means of the gussets of the first series and in threaded connection therewith.

GERALD D. ARNOLD.

REFERENCES CITED

The following references are of record in the file of this patent:

UNITED STATES PATENTS

| Number | Name | Date |
| --- | --- | --- |
| D. 126,047 | Kurth | Mar. 25, 1941 |
| 1,345,260 | Schwartz | June 29, 1920 |
| 1,477,823 | Grindle | Dec. 18, 1923 |
| 1,503,193 | Lindhard | July 29, 1924 |
| 1,988,678 | Arnold | Jan. 22, 1935 |
| 2,073,889 | Trout | Mar. 16, 1937 |
| 2,076,873 | Arnold | Apr. 13, 1937 |
| 2,113,047 | French | Apr. 5, 1938 |
| 2,132,972 | Schmidt | Oct. 11, 1938 |
| 2,275,600 | Arnold | Mar. 10, 1942 |
| 2,372,830 | Honerkamp et al. | Apr. 3, 1945 |

FOREIGN PATENTS

| Number | Country | Date |
| --- | --- | --- |
| 2,784 | Sweden | Apr. 25, 1890 |
| 309,034 | Germany | Nov. 9, 1918 |